J. J. MEYER, Jr.
BLOW HEAD FOR BOTTLE BLOWING MACHINES.
APPLICATION FILED APR. 7, 1916.
1,209,472.
Patented Dec. 19, 1916.
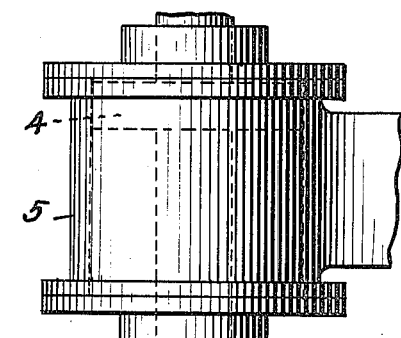
FIG.1.
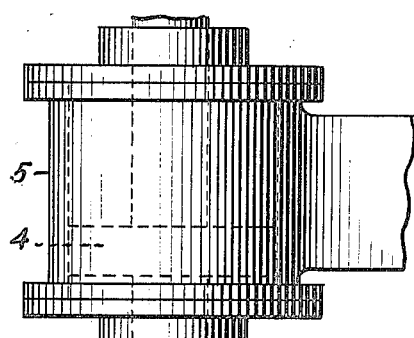
FIG.2.
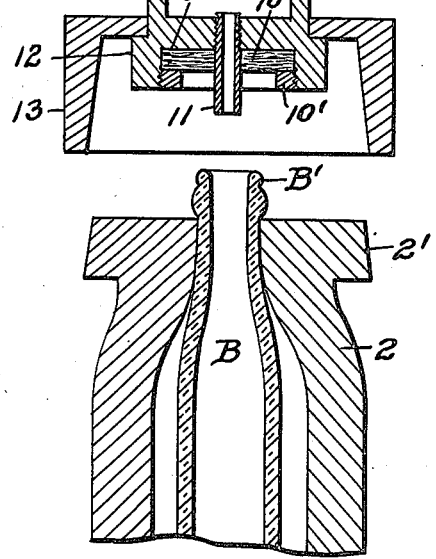
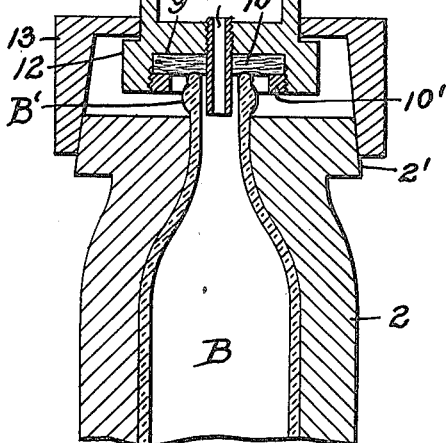
WITNESSES
INVENTOR

UNITED STATES PATENT OFFICE.

JOHN J. MEYER, JR., OF GLENSHAW, PENNSYLVANIA.

BLOW-HEAD FOR BOTTLE-BLOWING MACHINES.

1,209,472.  Specification of Letters Patent.  Patented Dec. 19, 1916.

Application filed April 7, 1916. Serial No. 89,590.

*To all whom it may concern:*

Be it known that I, JOHN J. MEYER, Jr., a citizen of the United States, and resident of Glenshaw, in the county of Allegheny and State of Pennsylvania, have invented certain new and useful Improvements in Blow-Heads for Bottle-Blowing Machines, of which the following is a specification.

The primary object of this invention is to provide a simple and efficient blow head for bottle blowing machines wherein an air sealed connection is had between the head and the bottle, such connection being maintained by the weight of the head and the pressure of air therein, the construction being such that the bottle is relieved of damaging pressure that frequently occurs in machines as at present constructed wherein there is a tendency to subject the bottle to undue weight or pressure when the head is in blowing position.

With the improved mechanism of the present invention the movement of the blow head carrier is quite independent of the head after the latter has been connected with the bottle, the weight of the head and the air pressure therein being then relied on for maintaining the necessary connection, and there is no tendency to distort the bottle extremity to which the blow head is applied.

The invention also includes an improved arrangement of air discharge tube for conducting the air into the bottle. Also the blow head is adapted to carry a mold-embracing cap for holding the parts in accurate position without, however, interfering with the action of the head.

In the accompanying drawings, Figure 1 illustrates an embodiment of the invention in vertical section, the blow head being shown separated from the bottle blank with which it is adapted to connect. Fig. 2 is a view similar to Fig. 1 with the blow head lowered and in operative relation with the bottle and the bottle-inclosing mold.

Referring to the drawings, 2 designates a sectional or divided blow mold of usual construction which is adapted to inclose a bottle blank B and in which the latter is blown to final form as in Fig. 2. The upper or mouth extremity B' of the blank projects above the mold and the blowing head is adapted to connect therewith, as will presently be described.

In the adaptation here illustrated, the blow head is carried by a tubular stem 3 secured to a piston 4, the latter movable vertically in cylinder 5 for raising and lowering the blow head in manner well known in the art, tubular stem 3 being provided with a suitable connection, not shown, for supplying it with compressed air.

The blow head is in the form of a hollow body 6 having a tubular block-like upper end 7 in which the headed lower portion 3' of tube 3 is movably fitted, the bore 7' of block 7 being shaped complementary with head 3' and adapted to form a seat therefor as in Fig. 1 when the blow head is fully lowered on its carrier. And with the head thus seated, the lateral ports 8 in head 3' are closed and air is prevented from escaping from the tubular carrier.

Formed in the under side of head 6 is cavity 9 with a sealing gasket 10 of asbestos or equivalent material secured therein by ring 10'. Depending from the bottom of the head is the air delivering tube 11.

The lower portion of head 6 is formed with external shoulder 12 for carrying the downwardly facing cap 13 that is adapted to movably embrace the upper portion 2' of mold 2, the faces of the cap and said mold part being inclined to provide a wedging action for holding the sectional mold tightly closed during the blowing operation. Above shoulder 12 the blow head is freely movable in cap 13 so that downward movement of the head is not interfered with by the seating of the cap on the mold.

In operation, the normal position of the parts is as shown in Fig. 1, the blow head being fully lowered and the discharge of air from carrier 3 prevented. Upon being lowered into position, the mold top is first embraced by cap 13, so that blank B is tightly inclosed. The further downward movement seats the blowing head on the blank extremity B', the sealing gasket 9 providing an air tight connection which is maintained by the weight of the blowing head and the air pressure therein, and the latter in its seated position is not interfered with nor is additional force or pressure communicated to the bottle by the further downward movement of supporting stem 3. With the parts connected as in Fig. 2, tube 11 is projected well into the blank and serves to effectually direct the compressed air thereinto, and the lowering of stem 3 after head 6 has been seated results in opening the ports and admitting air into the head from said stem. Upon withdrawing the blowing head the supply of air is automatically shut off, as will be understood.

The coiled spring 14 embracing stem 3 between blowing head and cylinder 5 operates to hold the blow head in depressed port-closing position as in Fig. 1 when stem 3 is raised, said spring being fully distended when stem 3 is lowered as in Fig. 2 so that it then exerts practically no force on the blow head. The spring is not essential and may be omitted.

I claim:

1. The combination of a hollow head having an outlet in its bottom wall and with the external face of said wall adapted to make seal forming engagement with the open extremity of a glass blank and with the latter comprising the sole support for the head when in engagement therewith, a vertically movable carrier for the head, the carrier having unimpeded downward movement relatively to the head when the latter is in sealed engagement with the blank, and means for admitting compressed air to the blank-sustained head.

2. The combination of a hollow head having a contracted outlet in its bottom wall and with the external face of said wall adapted to make seal forming engagement with the open extremity of a glass blank and with the latter comprising the sole support for the head when in engagement therewith, a vertically movable carrier for the head, the carrier having unimpeded downward movement relatively to the head when the latter is in sealed engagement with the blank, and means for admitting compressed air to the head cavity, the air pressure on the bottom wall of the head cavity supplementing the weight of the head in holding the latter in sealed engagement with the blank.

3. The combination of a hollow head having a contracted outlet in its bottom wall and with the external face of said wall adapted to make seal forming engagement with the open extremity of a glass blank and with the latter comprising the sole support for the head when in engagement therewith, a tubular vertically movable carrier for the head with the carrier adapted to communicate with the head cavity for admitting compressed air thereto when the head is in position on the blank, the carrier having unimpeded downward movement relatively to the head when the latter is in said position, the air pressure on the bottom of the head cavity supplementing the weight of the head in holding the latter in sealed engagement with the blank.

4. The combination of a glass mold adapted to contain a glass article having an open end, a hollow head adapted to seat on and communicate with said open end, a mold-embracing cap carried by and movable vertically on the head, a vertically movable support from which the head depends and with the support and head adapted for relative vertical movement, and means controlled by such relative vertical movement for controlling the admission of compressed air to the head.

5. The combination of a tubular vertically movable support ported at its lower end, a hollow head depending from and slidable on the support and adapted when in lowered position to close said ports, the head formed with an external shoulder, a mold-embracing cap movable vertically on the head and held thereon by said shoulder, the head open at its lower end and at said end adapted to connect with the open end of a glass article.

6. The combination of a container for compressed air having a wall thereof provided with an air outlet, the wall adapted to have sealing connection with and be supported by the open extremity of a glass blank with said outlet in communication with the blank, and means for supplying compressed air to the container with the resulting pressure on said container wall operating to maintain the sealing connection between the latter and the blank.

In testimony whereof, I affix my signature in presence of two witnesses.

JOHN J. MEYER, JR.

Witnesses:
ALEX. C. DODD,
S. B. MEYER.